United States Patent
Wong et al.

(10) Patent No.: US 6,803,842 B1
(45) Date of Patent: Oct. 12, 2004

(54) LONGITUDINAL MODE SOLID SLUG OPTICAL LATCHING RELAY

(75) Inventors: Marvin Glenn Wong, Woodland Park, CO (US); Arthur Fong, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 61 days.

(21) Appl. No.: 10/412,858

(22) Filed: Apr. 14, 2003

(51) Int. Cl.$^7$ ................................................. G02B 6/26
(52) U.S. Cl. ..................... 335/47; 335/49; 335/56; 335/58; 385/8; 385/9; 385/16; 385/17; 385/18; 385/19; 385/39
(58) Field of Search .................... 335/47–58; 385/8, 385/9, 15–23, 39–47, 50

(56) References Cited

U.S. PATENT DOCUMENTS

| | | | |
|---|---|---|---|
| 3,657,647 A | | 4/1972 | Beusman et al. |
| 4,103,135 A | | 7/1978 | Gomez et al. |
| 4,200,779 A | | 4/1980 | Zakurdaev et al. |
| 4,238,748 A | | 12/1980 | Goullin et al. |
| 4,245,886 A | * | 1/1981 | Kolodzey et al. ............. 385/19 |
| 4,336,570 A | | 6/1982 | Brower et al. |
| 4,419,650 A | | 12/1983 | John |
| 4,434,337 A | | 2/1984 | Becker |
| 4,475,033 A | | 10/1984 | Willemsen et al. |
| 4,505,539 A | * | 3/1985 | Auracher et al. ............. 385/19 |
| 4,582,391 A | * | 4/1986 | Legrand ....................... 385/17 |
| 4,628,161 A | | 12/1986 | Thackrey |
| 4,652,710 A | | 3/1987 | Karnowsky et al. |
| 4,657,339 A | | 4/1987 | Fick |
| 4,742,263 A | | 5/1988 | Harnden, Jr. et al. |
| 4,786,130 A | | 11/1988 | Georgiou et al. |
| 4,797,519 A | | 1/1989 | Elenbaas |
| 4,804,932 A | | 2/1989 | Akanuma et al. |

(List continued on next page.)

FOREIGN PATENT DOCUMENTS

| | | |
|---|---|---|
| EP | 0593836 A1 | 4/1994 |
| FR | 2418539 | 9/1979 |
| FR | 2458138 | 12/1980 |
| FR | 2667396 | 4/1992 |
| JP | SHO 36-18575 | 10/1961 |
| JP | SHO 47-21645 | 10/1972 |
| JP | 62-276838 | 12/1987 |
| JP | 63-294317 | 12/1988 |
| JP | 8-125487 | 5/1996 |
| JP | 9161640 | 6/1997 |
| WO | WO99/46624 | 12/1999 |

OTHER PUBLICATIONS

Jonathan Simon, "A Liquid–Filled Microrelay With A Moving Mercury Microdrop" (Sep. 1997), Journal of Microelectromechinical Systems, vol. 6, No. 3. pp. 208–216.

(List continued on next page.)

*Primary Examiner*—Ramon M. Barrera (57) ABSTRACT

A piezoelectric optical relay array having one or more array elements. Each array element contains a transparent mirror housing, located at the intersection of two optical paths. A solid slug is moved within a channel passing through the transparent mirror housing by the action of piezoelectric elements. A surface of the solid slug is wetted by a liquid metal to form a reflective surface. The solid slug is moved in or out of the transparent mirror housing to select between the optical paths. When the solid slug is within the transparent mirror housing, an incoming optical signal is reflected from the reflective surface of the liquid metal. The liquid metal adheres to wettable metal surfaces within the channel to provide a latching mechanism.

22 Claims, 5 Drawing Sheets

U.S. PATENT DOCUMENTS

| | | | |
|---|---|---|---|
| 4,988,157 A | * | 1/1991 | Jackel et al. ................. 385/17 |
| 5,278,012 A | | 1/1994 | Yamanaka et al. |
| 5,415,026 A | | 5/1995 | Ford |
| 5,502,781 A | | 3/1996 | Li et al. |
| 5,644,676 A | | 7/1997 | Blomberg et al. |
| 5,675,310 A | | 10/1997 | Wojnarowski et al. |
| 5,677,823 A | | 10/1997 | Smith |
| 5,751,074 A | | 5/1998 | Prior et al. |
| 5,751,552 A | | 5/1998 | Scanlan et al. |
| 5,828,799 A | | 10/1998 | Donald |
| 5,841,686 A | | 11/1998 | Chu et al. |
| 5,849,623 A | | 12/1998 | Wojnarowski et al. |
| 5,874,770 A | | 2/1999 | Saia et al. |
| 5,875,531 A | | 3/1999 | Nellissen et al. |
| 5,886,407 A | | 3/1999 | Polese et al. |
| 5,889,325 A | | 3/1999 | Uchida et al. |
| 5,912,606 A | | 6/1999 | Nathanson et al. |
| 5,915,050 A | | 6/1999 | Russell et al. |
| 5,972,737 A | | 10/1999 | Polese et al. |
| 5,994,750 A | | 11/1999 | Yagi |
| 6,021,048 A | | 2/2000 | Smith |
| 6,180,873 B1 | | 1/2001 | Bitko |
| 6,201,682 B1 | | 3/2001 | Mooij et al. |
| 6,207,234 B1 | | 3/2001 | Jiang |
| 6,212,308 B1 | | 4/2001 | Donald |
| 6,225,133 B1 | | 5/2001 | Yamamichi et al. |
| 6,278,541 B1 | | 8/2001 | Baker |
| 6,304,450 B1 | | 10/2001 | Dibene, II et al. |
| 6,320,994 B1 | | 11/2001 | Donald et al. |
| 6,323,447 B1 | | 11/2001 | Kondoh et al. |
| 6,351,579 B1 | | 2/2002 | Early et al. |
| 6,356,679 B1 | * | 3/2002 | Kapany ....................... 385/18 |
| 6,373,356 B1 | | 4/2002 | Gutierrez et al. |
| 6,396,012 B1 | | 5/2002 | Bloomfield |
| 6,396,371 B2 | | 5/2002 | Streeter et al. |
| 6,408,112 B1 | | 6/2002 | Bartels |
| 6,446,317 B1 | | 9/2002 | Figueroa et al. |
| 6,453,086 B1 | | 9/2002 | Tarazona |
| 6,470,106 B2 | * | 10/2002 | McClelland et al. .......... 385/16 |
| 6,487,333 B2 | | 11/2002 | Fouquet |
| 6,501,354 B1 | | 12/2002 | Gutierrez et al. |
| 6,512,322 B1 | | 1/2003 | Fong et al. |
| 6,515,404 B1 | | 2/2003 | Wong |
| 6,516,504 B2 | | 2/2003 | Schaper |
| 6,559,420 B1 | | 5/2003 | Zarev |
| 6,633,213 B1 | | 10/2003 | Dove |
| 2002/0037128 A1 | | 3/2002 | Burger et al. |
| 2002/0146197 A1 | | 10/2002 | Yong |
| 2002/0150323 A1 | | 10/2002 | Nishida et al. |
| 2002/0168133 A1 | | 11/2002 | Saito |
| 2003/0035611 A1 | | 2/2003 | Shi |

OTHER PUBLICATIONS

Marvin Glenn Wong, "A Piezoelectrically Actuated Liquid Metal Switch", May 2, 2002, patent application (pending, 12 pages of specification, 5 pages of claims, 1 page of abstract, and 10 sheets of drawings (Figs. 1–10).

TDB–ACC–No: NB406827, "Integral Power Resistors for Aluminum Substrate." IBm Technical Desclosure Bulletin, Jun. 1984, US, vo27, Issue No. 1B, p. 827.

Bhedwar, Homi C. et al. "Ceramic Multilayer Package Fabrication," Electronic Materials Handbook, Nov. 1989, pp. 460–469, vol. 1 Packaging, Section 4: Packages.

Kim, Joonwon et al. "A Micromechanical Switch with Electrostatically Driven Liquid–Metal Droplet," Sensors and Actuators, A: Physical. v 9798, Apr. 1, 2002, 4 pages.

* cited by examiner

LONGITUDINAL MODE SOLID SLUG OPTICAL LATCHING RELAY

CROSS REFERENCE TO RELATED APPLICATIONS

This application is related to the following U.S. Patent Applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", having the same filing date as the present application and identified by Ser. No. 10/413,068;

Application 10010531-1, "High Frequency Bending Mode Latching Relay", having the same filing date as the present application and identified by Ser. No. 10/412,912;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", having the same filing date as the present application and identified by Ser. No. 10/412,991;

Application 10010572-1, "Liquid Metal, Latching Relay with Face Contact", having the same filing date as the present application and identified by Ser. No. 10/413,195;

Application 10010573-1, "Insertion Type Liquid Metal Latching Relay", having the same filing date as the present application and identified by Ser. No. 10/412,824;

Application 10010617-1, "High-frequency, Liquid Metal, Latching Relay Array", having the same filing date as the present application and identified by Ser. No. 10/413,278;

Application 10010618-1, "Insertion Type Liquid Metal Latching Relay Array", having the same filing date as the present application and identified by Ser. No. 10/412,880;

Application 10010634-1, "Liquid Metal Optical Relay", having the same filing date as the present application and identified by Ser. No. 10/413,267;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", having the same filing date as the present application and identified by Ser. No. 10/413,314;

Application 10010644-1, "Bending Mode Liquid Metal Switch", having the same filing date as the present application and identified by Ser. No. 10/413,328;

Application 10010656-1, titled "A Longitudinal Mode Optical Latching Relay", having the same filing date as the present application and identified by Ser. No. 10/413,215;

Application 10010663-1, "Method and Structure for a Pusher-Mode Piezoelectrically Actuated Liquid Metal Switch", having the same filing date as the present application and identified by Ser. No. 10/413,098;

Application 10010664-1, "Method and Structure for a Pusher-Mode Piezoelectrically Actuated Liquid Metal Optical Switch", having the same filing date as the present application and identified by Ser. No. 10/412,895;

Application 10010790-1, titled "Switch and Production Thereof", filed Dec. 12, 2002 and identified by Ser. No. 10/317,597;

Application 10011055-1, "High Frequency Latching Relay with Bending Switch Bar", having the same filing date as the present application and identified by Ser. No. 10/413,237;

Application 10011056-1, "Latching Relay with Switch Bar", having the same filing date as the present application and identified by Ser. No. 10/413,099;

Application 10011064-1, "High Frequency Push-mode Latching Relay", having the same filing date as the present application and identified by Ser. No. 10/413,100;

Application 10011065-1, "Push-mode Latching Relay", having the same filing date as the present application and identified by Ser. No. 10/413,067;

Application 10011121-1, "Closed Loop Piezoelectric Pump", having the same filing date as the present application and identified by Ser. No. 10/412,857;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", having the same filing date as the present application and identified by Ser. No. 10/412,869;

Application 10011345-1, "Method and Structure for a Slug Assisted Longitudinal Piezoelectrically Actuated Liquid Metal Optical Switch", having the same filing date as the present application and identified by Ser. No. 10/412,916;

Application 10011397-1, "Method and Structure for a Slug Assisted Pusher-Mode Piezoelectrically Actuated Liquid Metal Optical Switch", having the same filing date as the present application and identified by Ser. No. 10/413,070;

Application 10011398-1, "Polymeric Liquid Metal Switch", having the same filing date as the present application and identified by Ser. No. 10/413,094;

Application 10011410-1, "Polymeric Liquid Metal Optical Switch", having the same filing date as the present application and identified by Ser. No. 10/412,859;

Application 10011436-1, "Longitudinal Electromagnetic Latching Optical Relay", having the same filing date as the present application and identified by Ser. No. 10/412,868;

Application 10011437-1, "Longitudinal Electromagnetic Latching Relay", having the same filing date as the present application and identified by Ser. No. 10/413,329;

Application 10011458-1, "Damped Longitudinal Mode Optical Latching Relay", having the same filing date as the present application and identified by Ser. No. 10/412,894;

Application 10011459-1, "Damped Longitudinal Mode Latching Relay", having the same filing date as the present application and identified by Ser. No. 10/412,914;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal MicroSwitches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020231-1, titled "Ceramic Channel Plate for a Switch", filed Dec. 12, 2002 and identified by Ser. No. 10/317,960;

Application 10020241-1, "Method and Apparatus for Maintaining a Liquid Metal Switch in a Ready-to-Switch Condition", having the same filing date as the present application and identified by Ser. No. 10/413,002;

Application 10020473-1, titled "Reflecting Wedge Optical Wavelength Multiplexer/Demultiplexer", having the same filing date as the present application and identified by Ser. No. 10/413,270;

Application 10020540-1, "Method and Structure for a Solid Slug Caterpillar Piezoelectric Relay", having the same filing date as the present application and identified by Ser. No. 10/413,088;

Application 10020541-1, titled "Method and Structure for a Solid Slug Caterpillar Piezoelectric Optical Relay", having the same filing date as the present application and identified by Ser. No. 10/413,196;

Application 10020698-1, titled "Laser Cut Channel Plate for a Switch", file Dec. 12, 2002 and identified by Ser. No. 10/317,932;

Application 10030438-1, "Inserting-finger Liquid Metal Relay", having the same filing date as the present application and identified by Ser. No. 10/413,187;

Application 10030440-1, "Wetting Finger Liquid Metal Latching Relay", having the same filing date as the present application and identified by Ser. No. 10/413,058;

Application 10030521-1, "Pressure Actuated Optical Latching Relay", having the same filing date as the present application and identified by Ser. No. 10/412,874;

Application 10030522-1, "Pressure Actuated Solid Slug Optical Latching Relay", having the same filing date as the present application and identified by Ser. No. 10/413,162; and Application 10030546-1, "Method and Structure for a Slug Caterpillar Piezoelectric Reflective Optical Relay", having the same filing date as the present application and identified by Ser. No. 10/412,910.

FIELD OF THE INVENTION

The invention relates to the field of optical switching relays, and in particular to a piezoelectrically activated optical relay array that latches by means of a liquid metal.

BACKGROUND OF THE INVENTION

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of bubbles in liquid. The moveable mirrors may use electrostatic latching mechanisms, whereas bubble switches do not latch. Piezoelectric latching relays may either use residual charges in the piezoelectric material to latch, or actuate switch contacts containing a latching mechanism.

SUMMARY

This invention describes an optical relay array that uses a liquid metal, such as mercury, as a switching mechanism and as a latching mechanism. The present invention relates to a piezoelectric optical relay array having one or more array elements. An array element contains a transparent mirror housing, located at the intersection of two optical paths. A solid slug is moved within a channel passing through the transparent mirror housing by the action of piezoelectric elements. A surface of the solid slug is wetted by a liquid metal to form a reflective surface. The solid slug is moved in or out of the transparent mirror housing to select between the optical paths. When the solid slug is within the transparent mirror housing, an incoming optical signal is reflected from the reflective surface of the liquid metal; otherwise the optical signal passes through the transparent housing. The liquid metal may also adhere to wettable metal surfaces within the channel to provide a latching mechanism.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to an optical relay that latches by means of a liquid metal, such as mercury. When a small volume of liquid metal wets a surface, the surface tension of liquid metal tends to hold the liquid metal to the surface. In an optical relay consistent with certain embodiments of the present invention, a solid slug, wetted with liquid metal, is used to block or unblock an optical path. Surface tension is used as a latching mechanism to maintain the position of the liquid metal.

Piezoelectric materials and magnetorestrictive materials (collectively referred to as "piezoelectric" materials below) deform when an electric or magnetic field is applied.

The relay operates by means of the longitudinal deformation of a piezoelectric element, in extension mode, displacing a solid slug that is wettable by a liquid metal drop and causing it to wet between at least one contact pad on the piezoelectric element or substrate and at least one other, fixed pad to block the optical path. The same motion that causes the solid slug and the attached liquid metal drops to change position can cause the optical path to be unblocked between the fixed pad and a contact pad on the piezoelectric element or substrate close to it. This motion of the piezoelectric element is rapid and causes the imparted momentum of the solid slug and liquid metal drops to overcome the surface tension forces that would otherwise hold them in contact with the contact pad or pads near the actuating piezoelectric element. The switch latches by means of surface tension and the liquid metal wetting to the contact pads. The liquid metal attached to the solid slug can wet to wettable metal elements in the optical path cavity, thereby creating a mirror effect that can be used to redirect the optical signal in a different direction.

In accordance with certain embodiments, the switch is made using micro-machining techniques to obtain small size. In this embodiment the switching time is short. For comparison, piezoelectrically driven thermal inkjet printheads have firing frequencies of several kHz and the fluid dynamics afforded by the present invention is much simpler than in an inkjet print head. Little heat is generated since the only heat generators are the piezoelectric element and the passage of control currents through the conductors of the switch.

Figure 1:
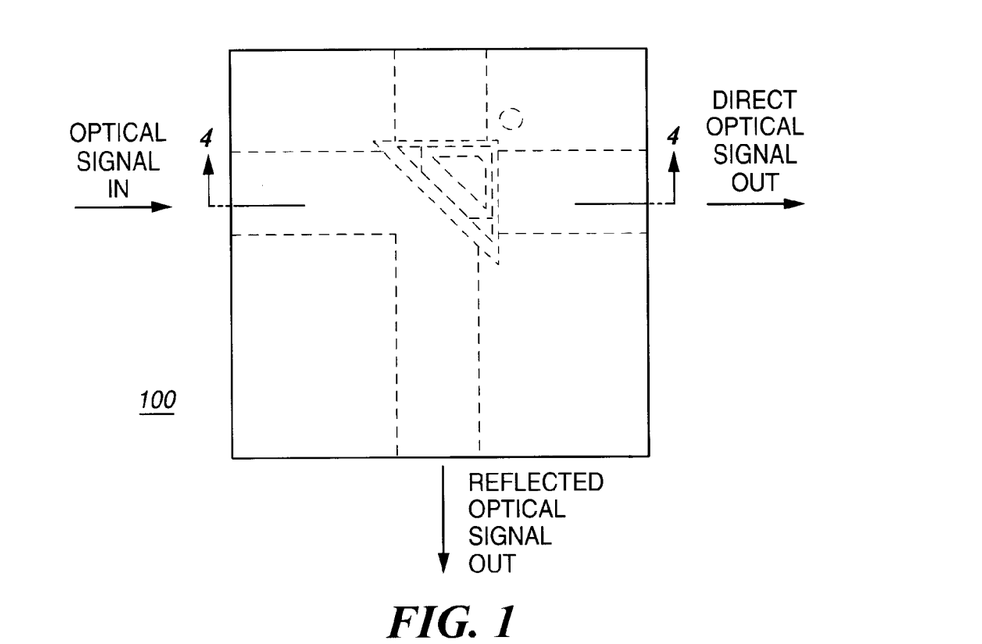
FIG. 1 is a top view of an optical layer of an optical relay consistent with certain embodiments of the present invention.

FIG. 1 is a top view of the optical layer of an optical relay 100 of one embodiment of the present invention. Referring to FIG. 1, an optical signal enters the relay on the left side and either transmitted along a direct path through the relay to exit on the right side, or is reflected inside the relay to exit at the relay at the bottom in the figure. The section 4—4 is shown in FIG. 4 described below.

Figure 2:
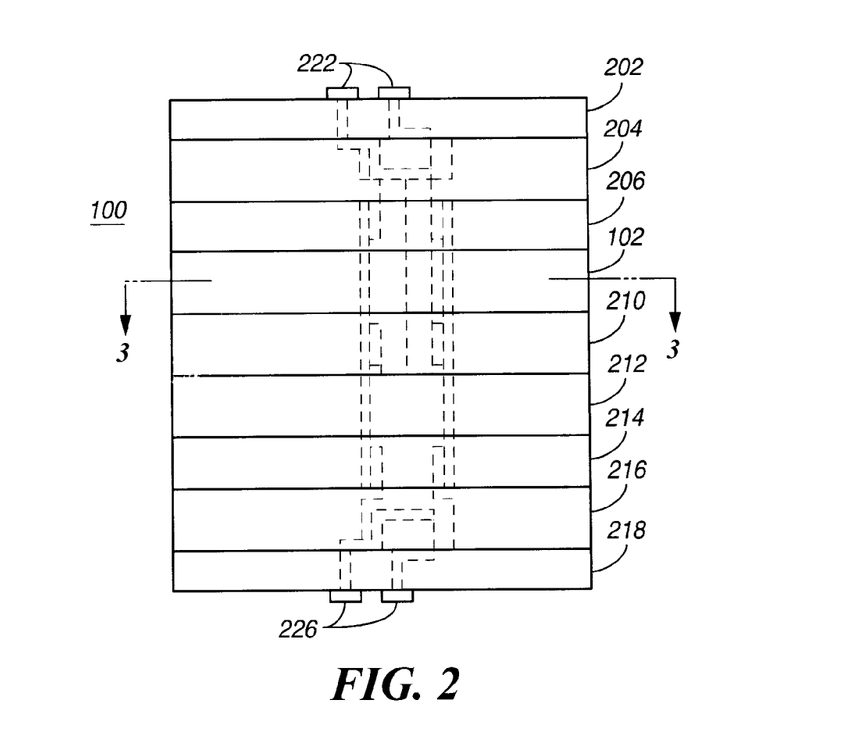
FIG. 2 is a side view of an optical layer of an optical relay consistent with certain embodiments of the present invention.

The micro-machined optical relay of the present invention is made up of a number of layers. FIG. 2 is a side view of the optical layer of an optical relay 100 of one embodiment of the present invention. The relay comprises upper and lower circuit substrates 202 and 218, upper and lower piezoelectric layers 204 and 216, upper, middle and lower seal belt or spacer layers 206, 210 and 214 and upper and lower optical switching layers 102 and 212. Upper and lower electrical connections 222 and 226 are provided for control signals. The section 3—3 is shown in FIG. 3 described below.

Figure 3:
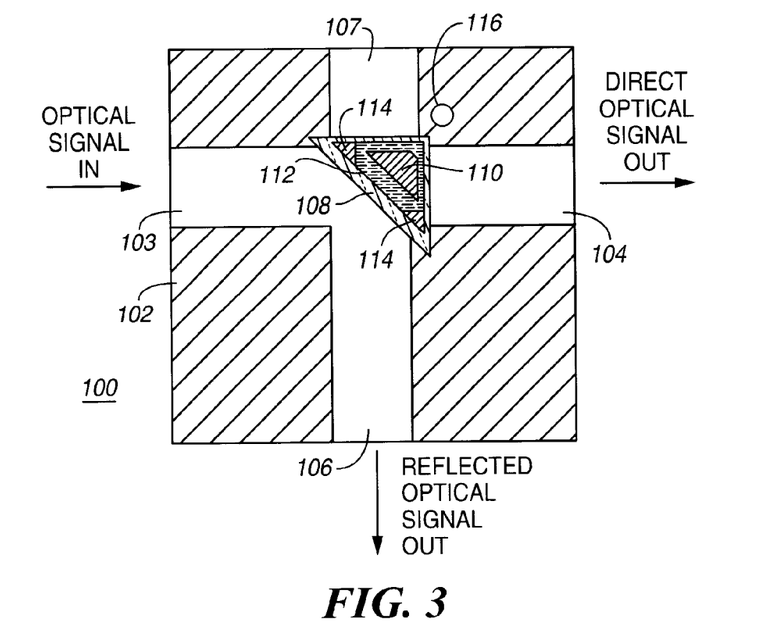
FIG. 3 is a sectional view of an optical layer of an optical relay consistent with certain embodiments of the present invention.

FIG. 3 is a sectional view through the section 3—3 of the optical relay 100 shown in FIG. 2. Referring to FIG. 3, the layer 102 contains a first input optical path or waveguide 103 and a first output optical path or waveguide 104. These paths are optically aligned to form a direct optical path through the layer. A second optical output path or waveguide 106 intersects the direct optical path. In operation, an optical signal enters path 103 (from the left in the figure) and either passes directly through the relay via path 104 or is deflected to exit the relay through path 106. A transparent, hollow tube 108 is located at the intersection of the paths 104 and 106. The transparent, hollow tube 108 is also referred to as a transparent mirror housing in the sequel. The axis of tube is substantially perpendicular to the layer 102. Tubes having other than triangular cross-sectional shapes may be used, however, one face of the tube should be planar and angled so that the normal to the face bisects the angle between the path 104 and the path 106. In FIG. 3, the paths are at right angles, so the face is angled at 45°. Other angles may be used without departing from the present invention. A solid slug of material 110 is positioned in a channel that passes through the transparent tube 108, and is free to slide axially along the channel. A liquid metal 112 is also contained within the channel. The surface of the solid slug 110, other than the ends, is wettable by the liquid metal, so surface tension holds the liquid metal in contact with the surface of the slug. Where the transparent tube passes through the optical layer, the corners of the transparent tube are filled with a wettable metal. The wettable metal 114 in one of the three corners is shown in FIG. 3. The liquid metal is drawn across the face of the slug by the surface tension attracting the liquid metal to the wettable metal in the corners of the tube. As a result, the surface of the liquid metal is planar and highly reflective. An optical signal entering the channel 103 is reflected from the surface of the liquid metal 108 and exits the relay through channel 106. When the solid slug 110 is moved out of the path of the optical signal, the optical signal passes through the transparent tube and exits the relay through channel 104. In operation, the solid slug 110 moves axially along the channel through the transparent tube. Displaced gas within the channel is allowed to flow from one end of the channel to the other via a vent 116. Optionally, a second optical input path 107 may be incorporated, to facilitate coupling of optical relays in an array.

Figure 4:
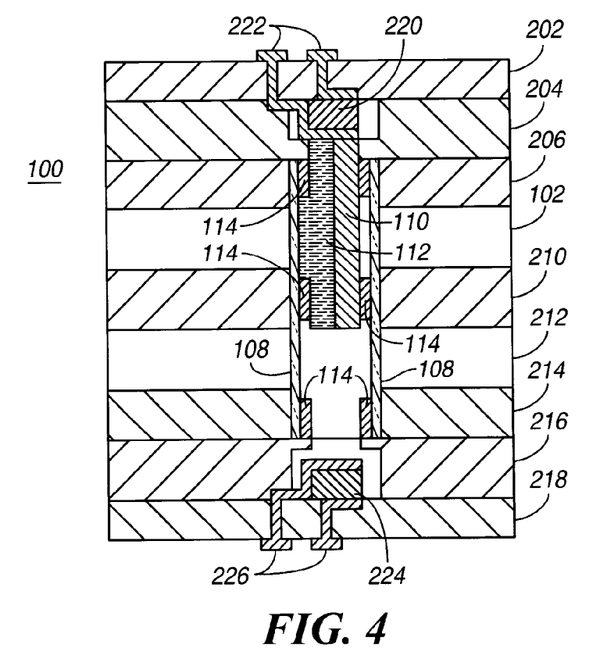
FIG. 4 is a sectional view of an optical relay consistent with certain embodiments of the present invention.

FIG. 4 shows a sectional view along the section 4—4 in FIG. 1. The optical relay 100 is made up of a number of layers that may be formed by micro-machining. An upper circuit layer 202 contains conductive vias and electrical interconnect pads 222. A spacer layer 204 includes a piezoelectric element 220. The piezoelectric element 220 is configured to move in a extensional mode parallel to the axis of the transparent tube (mirror housing) 108. Electrical drive signals are supplied to the piezoelectric element 220 through the conducting vias and electrical interconnect pads 222. An upper seal belt layer 206 holds the upper end of the transparent tube 108. In this layer, the transparent tube is lined with a wettable metal 114. Preferably, the wettable metal covers all interior faces of the transparent tube to form a seal belt or contact. In an alternative embodiment the transparent tube does not extend into the seal belt layer, and the wettable metal is applied to the substrate of the layer. In a still further embodiment, the wettable metal is applied to the surface of the piezoelectric element. When the solid slug is at the top of the transparent tube, as shown in FIG. 4, the liquid metal 112 fills the gaps between the solid slug 110 and the seal belt. Surface tension then holds the solid slug in place, preventing it from moving within the channel passing through the transparent tube. The combination of wettable surfaces and liquid metal provides a latching mechanism for the relay. The vent (116 in FIG. 3) opens into the seal belt layer 206. The first optical layer 102 contains an optical path, through which the transparent tube 108 passes. A middle seal belt layer 210 holds the middle of the transparent tube 108. In this layer, the transparent tube is lined with a wettable metal 114, to provide an additional latching mechanism. The spacer layer 212 may, optionally, contain additional optical paths. The lower seal belt layer 214 functions in the same way as the upper seal belt layer. The lower seal belt layer provides additional latching via lower seal belts 114 when the solid slug 110 is moved to the lower end of the transparent tube 108. The lower spacer layer 216 and the lower circuit layer 218 function the same as the corresponding upper layers, 204 and 202 respectively. The section through the optical layer, denoted as BB in FIG. 2, is shown in FIG. 1.

Figure 5:
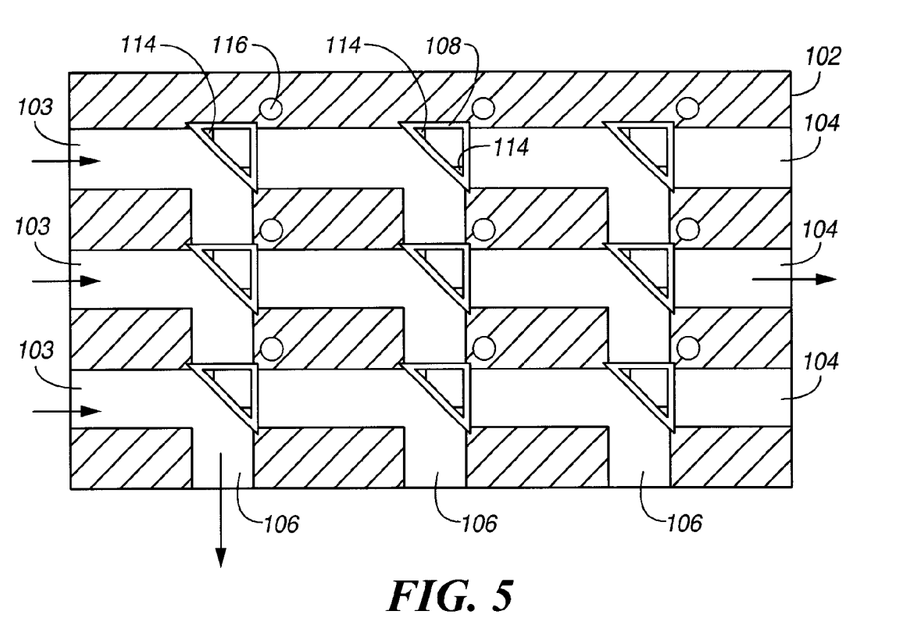
FIG. 5 is a sectional view of an optical layer of an optical relay array consistent with certain embodiments of the present invention.

FIG. 5 shows a section through the optical layer of an optical relay array comprising a rectangular grid of optical relay elements. The embodiment shown in FIG. 5 has nine elements, but other size arrays may be used. The optical relay array has three input optical paths 103 and three first output optical paths 104, which together form three direct optical paths through the layer. In addition, three second output optical paths 106 are provided, intersecting the three direct optical paths. A transparent mirror housing 108 is located at each of the nine intersections. In accordance with certain embodiments, the housing preferably has a triangular cross-section. A wettable metal 114 fills the corners of the transparent mirror housing 108. The wettable metal 114 is located on either side of the planar face of the housing. Close to each housing is a pressure relief vent 116, which passes through the optical layer 102. An input optical signal, entering the relay at one of the input optical paths 103, may be routed to one of the second output optical paths 106 by positioning a wetted slug at the intersection of the input optical path and the output optical path. The reflective surface of the wetted slug deflects the optical signal along a second output optical path. Alternatively, if no wetted slug is present, the input optical signal passes through the transparent mirror housing 108 and exits the relay from the corresponding first output optical path 104.

Figure 6:
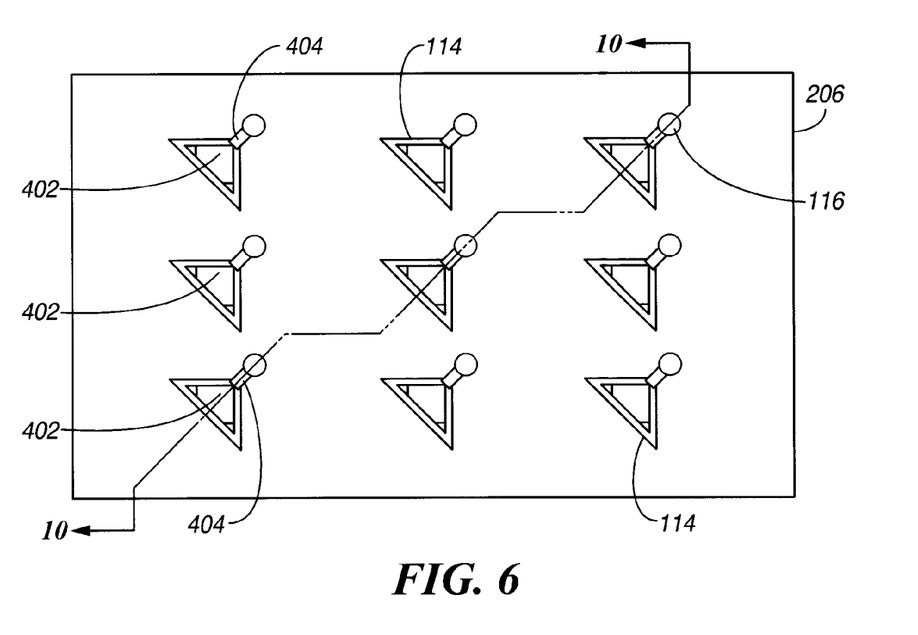
FIG. 6 is a top view of a seal belt layer of an optical relay array consistent with certain embodiments of the present invention.

FIG. 6 is a diagrammatic representation of an embodiment of an upper seal belt layer 206 of an optical relay array. The layer contains an array of nine triangular holes 402 through which wetted slugs may pass. Each hole is lined with a wettable metal seal belt or contact 114. Optionally, the transparent mirror housing may pass through the seal belt layer, as shown in FIG. 4, in which case the wettable metal lines the inside of the transparent mirror housing. Referring again to FIG. 6, each hole 402 is coupled by a channel 404 to the pressure relief vent 116. The channel 404 allows gas to flow between the hole and the vent. Middle seal belt layer 210 has a similar construction, but does not include channels 404. Lower seal belt layer 214 is also of a similar construction, except that the channels are on the lower surface of the layer.

Figure 7:
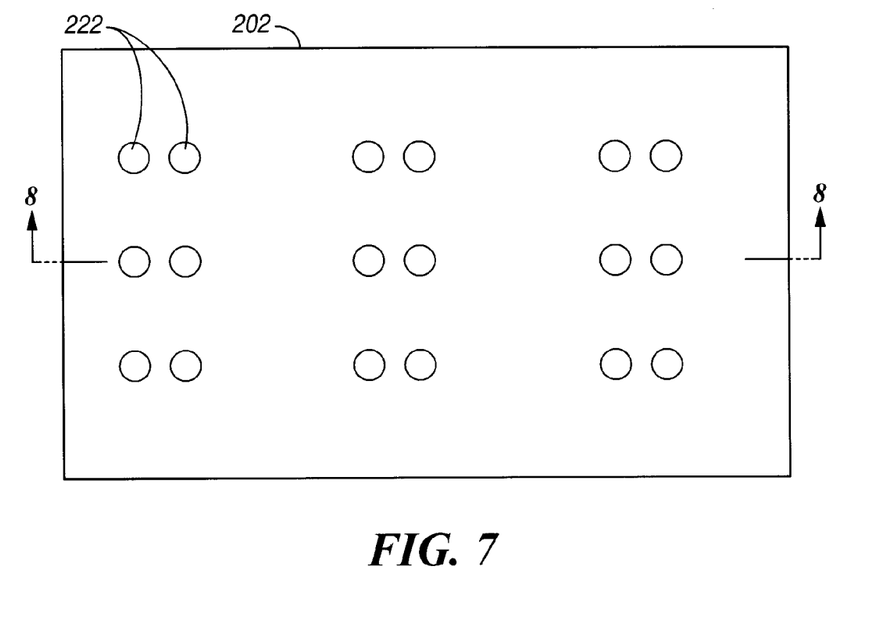
FIG. 7 is a view of an upper circuit layer of an optical relay array consistent with certain embodiments of the present invention.
Figure 8:
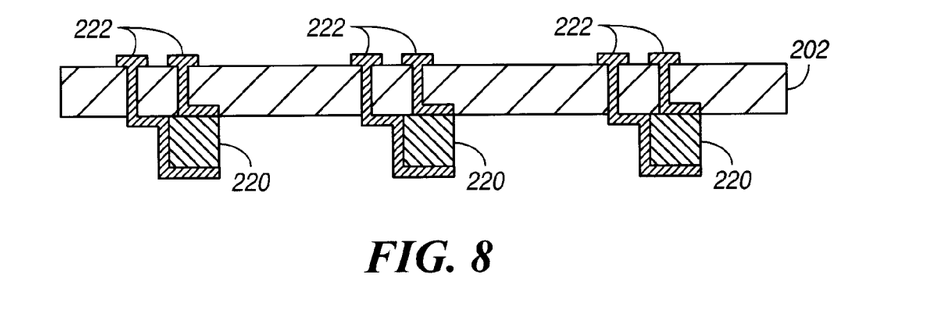
FIG. 8 is a sectional view of an upper circuit layer of an optical relay array consistent with certain embodiments of the present invention.

FIG. 7 is a view of the upper circuit layer of an optical relay array. Interconnection pads of electrical conductors 222 are located on top of the layer to facilitate connection of the relay to the electrical signals that control the piezoelectric elements of the array. FIG. 8 is a sectional view through the section 8—8 in FIG. 7. This shows how the conductors pass through vias in the circuit layer and couple to the piezoelectric elements 220. The electrical conductors couple to the top and bottom surfaces of the piezoelectric element and operate to supply an electric potential across the piezoelectric element. The lower circuit layer 218 has a similar construction.

Figure 9:
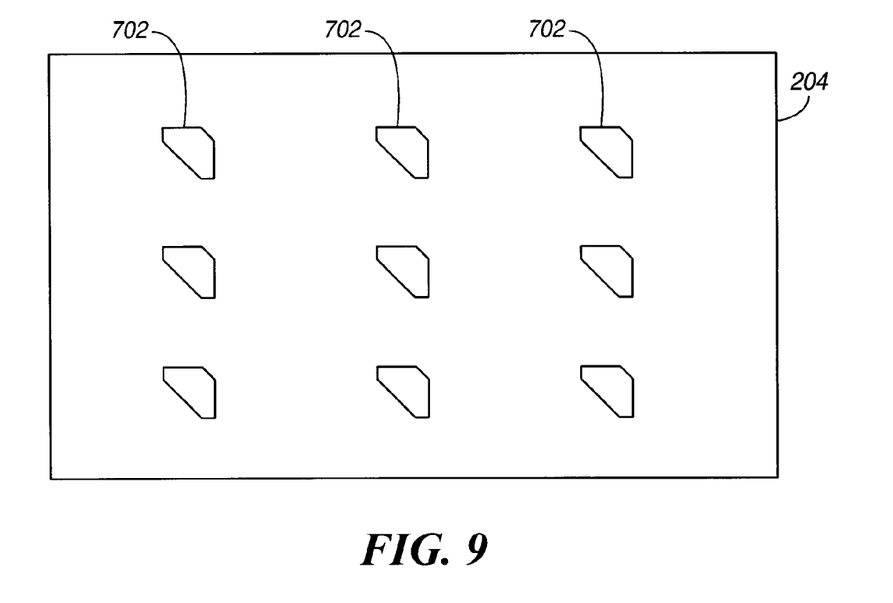
FIG. 9 is a view of a spacer layer of an optical relay array consistent with certain embodiments of the present invention.

An embodiment of a spacer layer of the optical relay array is shown in FIG. 9. The spacer layer contains an array of holes 702 through which wetted slugs may pass. These holes align with the corresponding holes in the other layers to form channels. The channel enables the wettable slugs can pass through the layers to block or unblock the direct optical paths.

Figure 10:
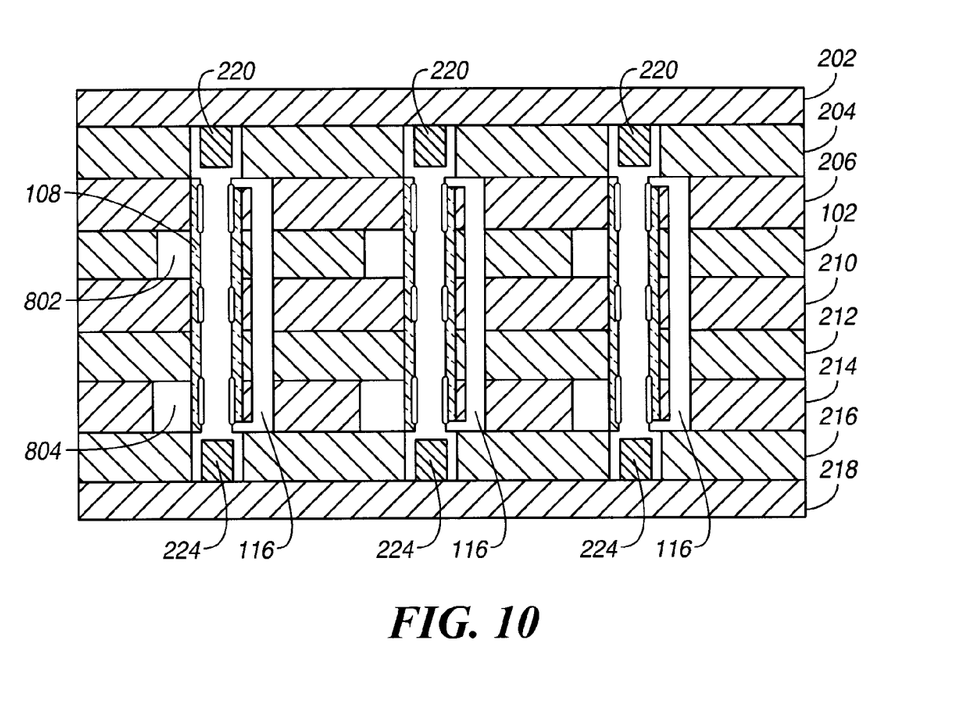
FIG. 10 is a further sectional view of an optical relay consistent with certain embodiments of the present invention.

FIG. 10 is a sectional view through the section 10—10 of the optical relay array shown in FIG. 6. The cross section is taken vertically through the pressure relief vents 116 and shows how the pressure relief vents open to the interior of the transparent mirror housing 108. Opening 802 in the optical layer 102, and other corresponding openings in the layer, are found at the intersection of the input optical paths and the output optical paths. Opening 804 is at a corresponding intersection in the optional lower optical path in spacer layer 214. For clarity, neither the solid slugs nor the electrical conductors are shown in FIG. 10. The pressure relief vents 116 allow gas to pass from one end of the hollow tube 108 to the other end as the solid slug moves within the tube. The pressure relief vents 116 also serve to dampen the motion of the solid slug as gas is forced through the vent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A piezoelectric optical relay array of one or more array elements, wherein an array element of the one or more array elements comprises:
   a first input optical path;
   a first output optical path, optically aligned with the first input optical path to form a direct optical path;
   a second output optical path intersecting the first input optical path;
   a transparent mirror housing, located at the intersection of the first input optical path and the second output optical path;
   a solid slug adapted to move within a channel passing through the transparent mirror housing, the solid slug having a planar surface wettable by liquid metal;
   a liquid metal volume covering the planar face of the solid slug to form a reflective surface;
   a first piezoelectric actuator operable to move the solid slug within the channel so that it blocks the direct optical path and completes a reflected optical path from the first input optical path to the second output optical path; and a second piezoelectric actuator operable to move the solid slug within the channel to remove it from the direct optical path.

2. A piezoelectric optical relay array in accordance with claim 1, wherein the array element further comprises a metal coating applied to a portion of the interior of the transparent mirror housing, the metal coating being wettable by liquid metal.

3. A piezoelectric optical relay array in accordance with claim 2, wherein the transparent mirror housing is a triangular tube and the metal coating is applied to the corners of the transparent mirror housing, the metal coating tending to cause the liquid metal to form a reflective surface covering the planar surface of the solid slug.

4. A piezoelectric optical relay array in accordance with claim 2, wherein the metal coating is applied to the interior of the channel above and below the direct and reflected optical paths so that liquid metal fills gaps between the solid slug and the metal coating and resists motion of the solid slug.

5. A piezoelectric optical relay array in accordance with claim 1, wherein the first piezoelectric element is operable to move the solid slug in a first direction by supplying an impulsive force to a first end of the solid slug and wherein the second piezoelectric element is operable to move the solid slug in a second direction by supplying an impulsive force to a second end of the solid slug.

6. A piezoelectric optical relay array in accordance with claim 1, wherein the array element further comprises a vent opening to and connecting the ends of the channel, the vent adapted to relieve pressure in the channel when the solid slug is moved.

7. A piezoelectric optical relay array in accordance with claim 6, wherein the vent is sized and positioned to dampen the motion to solid slug.

8. A piezoelectric optical relay array in accordance with claim 1, wherein the array element further comprises a second input optical path, optically aligned with the second output optical path.

9. A piezoelectric optical relay array in accordance with claim 8, wherein the array comprises a plurality of array elements arranged in a rectangular grid.

10. A piezoelectric optical relay array in accordance with claim 1, wherein the transparent mirror housing extends substantially the whole length of the channel.

11. A piezoelectric optical relay array in accordance with claim 10, wherein the transparent mirror housing is coated with a wettable metal above and below the direct and reflected optical paths so that liquid metal fills gaps between the solid slug and the wettable metal coating and resists motion of the solid slug.

12. A piezoelectric optical latching relay array, comprising:
   a plurality of input optical paths;
   a plurality of first output optical path, optically aligned with the plurality of input optical paths to form a plurality of direct optical paths;
   a plurality of second output optical paths intersecting the plurality of input optical path at a plurality of intersections; and
   at each of intersection of the plurality of intersections:
      a transparent mirror housing;
      a solid slug moveably located within a channel passing through the transparent mirror housing, the solid slug having a planar face wettable by liquid metal;
      a liquid metal volume covering the planar face of the solid slug to form a reflective surface;
      a first piezoelectric actuator operable to move the solid slug within the channel so that it blocks a direct optical path of the plurality of direct optical path and completes a reflected optical path from an input optical path of the plurality of input optical path to a second output optical path of the plurality of second output optical paths; and
      a second piezoelectric actuator operable to move the solid slug within the channel to remove the solid slug from a direct optical path of the plurality of direct optical paths.

13. A micro-machined piezoelectric optical relay array comprising in sequence:
   an upper spacer layer comprising a first piezoelectric element;
   a first pair of electrical connectors electrically coupled to the first piezoelectric element;
   an upper optical path layer comprising a first direct optical path and a first reflected optical path, the first direct optical path and the first reflected optical path having an intersection;
   a middle spacer layer;
   a lower spacer layer comprising a second piezoelectric element;
   a second pair of electrical connectors electrically coupled to the second piezoelectric element;
   a transparent mirror housing located at the intersection of the first direct optical path and the first reflected optical path;
   a solid slug wetted by a liquid metal and moveable positioned within a channel passing through the transparent mirror housing;
   wherein, the first piezoelectric element is operable to move the solid slug to a first position removed from the first direct optical path and the second piezoelectric element is operable to move the solid slug to a second position, within the direct optical path, where it completes the first reflected optical path by reflecting light from a wetted surface of the solid slug.

14. A micro-machined piezoelectric optical relay array in accordance with claim 13, further comprising:
   an upper seal belt layer between the upper spacer layer and the upper optical path layer and comprising an upper wettable metal contact;
   an middle seal belt layer between the upper optical path layer and the middle spacer layer and comprising a middle wettable metal contact; and
   a lower seal belt layer between the middle spacer layer and the lower spacer layer and comprising an lower wettable metal contact;
   wherein, in the first position, the solid slug is coupled by the liquid metal to the wettable metal contacts in the upper and middle seal belt layers and, in the second position, the solid slug is coupled by the liquid metal to the wettable metal contacts in the middle and lower seal belt layers.

15. A micro-machined piezoelectric optical relay array in accordance with claim 14, wherein the channel passes the upper, middle and lower seal belt layers and further comprising a pressure relief vent opening to the channel in the upper seal belt layer and the lower seal belt layer.

16. A micro-machined piezoelectric optical relay array in accordance with claim 14, wherein the hollow transparent housing passes the upper, middle and lower seal belt layers and further comprising a pressure relief vent opening to the hollow transparent housing in the upper seal belt layer and the lower seal belt layer.

17. A micro-machined piezoelectric optical relay array in accordance with claim 13, wherein the middle spacer layer comprises a second direct optical path and a second reflected optical path.

18. A micro-machined piezoelectric optical relay array in accordance with claim 13, wherein the upper optical path layer comprises a plurality of first direct optical paths and a plurality of first reflected optical paths.

19. A micro-machined piezoelectric optical relay array in accordance with claim 13, further comprising:

an upper circuit layer positioned on top of the upper spacer layer;

a lower circuit layer positioned below the lower spacer layer, wherein the first pair of electrical connectors passes through the upper circuit layer and terminates in a first pair of interconnection pads and the second pair of electrical connectors passes through the lower circuit layer and terminates in a second pair of interconnection pads.

20. A method for selecting between a direct optical path and a reflected optical path in a piezoelectric optical relay having a liquid metal coated solid slug moveable by a first piezoelectric element and a second piezoelectric element, the method comprising:

coupling an input optical signal to an input optical waveguide of the piezoelectric optical relay, the input optical waveguide being optically aligned with a first output optical waveguide to form the direct optical path;

if the direct optical path is to be selected:
applying an electrical impulse to the first piezoelectric element to move the solid slug out of the direct optical path, whereby the input optical waveguide is optically coupled to first output optical waveguide; and if the reflected optical path is to be selected:
applying an electrical impulse to the second piezoelectric element to move the solid slug into the direct optical path, whereby the input optical signal is reflected from a surface of the liquid metal coated solid slug into a second output optical waveguide to complete the reflected optical path.

21. A piezoelectric optical relay array of one or more array elements, wherein an array element of the one or more array elements comprises:

a first input optical path;

a first output optical path, optically aligned with the first input optical path to form a direct optical path;

a second output optical path intersecting the first input optical path;

a transparent mirror housing, located at the intersection of the first input optical path and the second output optical path;

a solid slug adapted to move within the channel passing through the transparent mirror housing, the solid slug having a planar surface wettable by liquid metal;

a liquid metal volume covering the planar face of the solid slug to form a reflective surface;

a first piezoelectric means for moving the solid slug within the channel to block the direct optical path and complete a reflected optical path from the first input optical path to the second output optical path; and a second piezoelectric means for moving the solid slug within the channel to remove it from the direct optical path.

22. A piezoelectric optical latching relay array, comprising:

a plurality of input optical paths;

a plurality of first output path, optically aligned with the plurality of input optcal paths to form a plurality of direct optical paths;

a plurlity of second output optical paths intersecting the plurality of input optical path at a plurality of intersections; and at each of intersection of the plurality of intersections:
a transparent mirror housing;
a solid slug moveably located within a channel passing through the transparent mirror housing, the solid slug having a planar face wettable by liquid metal;
a liquid metal volume covering the planar face of the solid slug to form a reflective surface;
a first piezoelectric means for moving the solid slug within the channel so that it blocks a direct a direct optical path of the plurality of direct optical path and completes a reflected optical path from an input optical path of the plurality of input optical papth to a second output optical path of the plurality of second output optical paths; and
a second piezoelectric means for moving the solid slug within the channel to remove the solid slug from a direct optical path of the plurality of direct optical paths.

* * * * *

UNITED STATES PATENT AND TRADEMARK OFFICE
CERTIFICATE OF CORRECTION

PATENT NO. : 6,803,842 B1
DATED : October 12, 2004
INVENTOR(S) : Marvin Glenn Wong and Arthur Fong It is certified that error appears in the above-identified patent and that said Letters Patent is hereby corrected as shown below:

<u>Column 12,</u>
Line 28, after "plurality of input," delete "optcal" and insert -- optical --
Line 42, after "it blocks a direct," delete "a direct"
Line 45, after "plurality of input optical," delete "papth" and insert -- path --

Signed and Sealed this

Twenty-second Day of March, 2005

JON W. DUDAS
*Director of the United States Patent and Trademark Office*